(12) United States Patent
Ling

(10) Patent No.: US 7,579,819 B1
(45) Date of Patent: Aug. 25, 2009

(54) APPARATUS AND METHOD FOR FLYWHEEL CURRENT INJECTION FOR A REGULATOR

(75) Inventor: Lawrence Hok-Sun Ling, Fanling (HK)

(73) Assignee: National Semiconductor Corporation, Santa Clara, CA (US)

( * ) Notice: Subject to any disclaimer, the term of this patent is extended or adjusted under 35 U.S.C. 154(b) by 106 days.

(21) Appl. No.: 11/736,497

(22) Filed: Apr. 17, 2007

Related U.S. Application Data

(63) Continuation-in-part of application No. 10/985,634, filed on Nov. 10, 2004, now Pat. No. 7,221,134.

(51) Int. Cl.
*G05F 1/575* (2006.01)
*G05F 1/618* (2006.01)

(52) U.S. Cl. .................. 323/285; 323/284; 323/286

(58) Field of Classification Search .................. 323/224, 323/265, 282, 284, 285, 351, 286, 287
See application file for complete search history.

(56) References Cited

U.S. PATENT DOCUMENTS

| 4,727,308 | A | 2/1988 | Huljak et al. |
| 6,894,471 | B2 | 5/2005 | Corva et al. |
| 7,019,497 | B2 | 3/2006 | Umminger et al. |
| 7,221,134 | B1 | 5/2007 | Ling et al. |
| 7,268,526 | B1 * | 9/2007 | Smith ..................... 323/285 |

* cited by examiner

*Primary Examiner*—Gary L Laxton
(74) *Attorney, Agent, or Firm*—Darby & Darby P.C.; Matthew M. Gaffney

(57) ABSTRACT

A constant on-time regulator that may use a capacitor with low ESR without needing a series resistor is provided. A capacitor is employed to AC-couple a current sense voltage into the reference signal to provide a modified reference signal. The comparator compares the feedback voltage with the modified reference signal rather than a constant reference signal. Also, a switch may be included between the current sense voltage and the reference signal to improve load regulation.

20 Claims, 7 Drawing Sheets

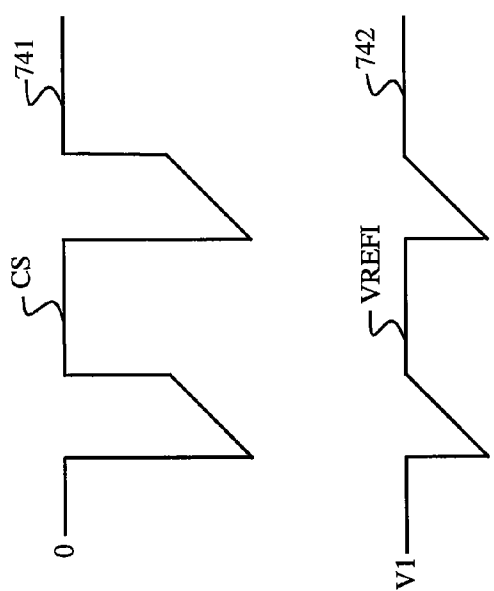

APPARATUS AND METHOD FOR FLYWHEEL CURRENT INJECTION FOR A REGULATOR

CROSS-REFERENCE TO RELATED APPLICATIONS

This utility patent application is a Continuation-in-Part of U.S. patent application Ser. No. 10/985,634, filed Nov. 10, 2004, the benefit of which is hereby claimed under 35 U.S.C. §120, and is further incorporated herein by reference.

FIELD OF THE INVENTION

The invention is related to regulators, and in particular, to an apparatus and method for flywheel current injection for a constant on-time regulator.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle or the frequency of the control signal is typically modulated based on negative feedback.

In a pulse width modulation (PWM) scheme, pulse width modulation is typically employed based on Vout, so that the on-time of the switch is modulated. In a constant on-time (COT) scheme, the on-time of the switch is relatively constant, and the off-time of the switch is modulated. Unlike the PWM scheme, a COT scheme typically does not need compensation. Also, a COT regulator typically has a relatively fast transient response.

BRIEF DESCRIPTION OF THE DRAWINGS

Non-limiting and non-exhaustive embodiments of the present invention are described with reference to the following drawings, in which:

FIG. 7 illustrates a timing diagram of waveforms of embodiments of signals from an embodiment of the circuit of FIG. 6, in accordance with aspects of the invention.

DETAILED DESCRIPTION

Figure 1:
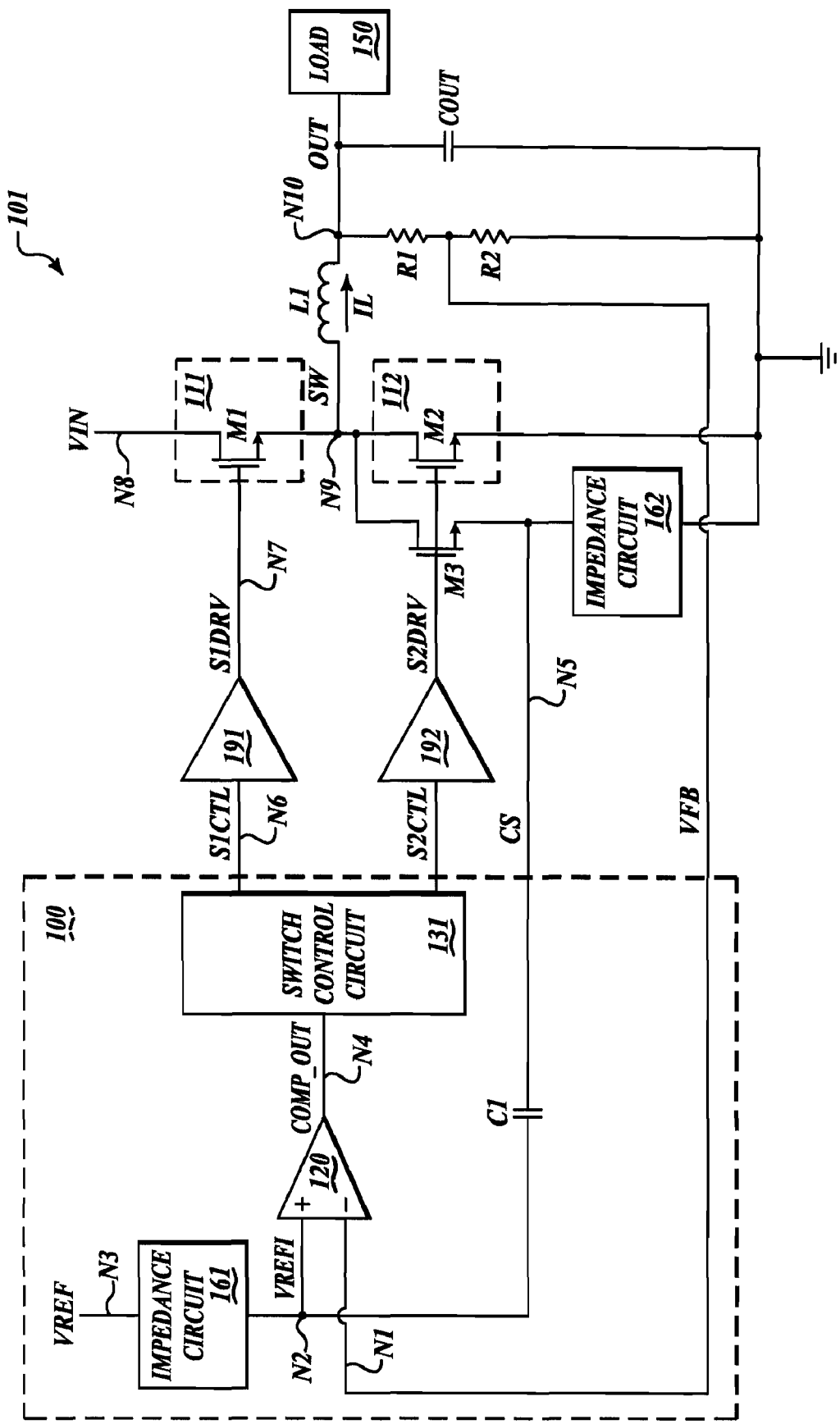
FIG. 1 illustrates a block diagram of an embodiment of a regulator and external components.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a constant on-time regulator that may use a capacitor with low ESR without needing a resistor in series with output capacitor. A capacitor is employed to AC-couple a current sense voltage into the reference signal to provide a modified reference signal. The comparator compares the feedback voltage with the modified reference signal rather than a constant reference signal. Also, a switch may be included between the current sense voltage and the reference signal to improve load regulation.

FIG. 1 illustrates a block diagram of an embodiment of circuit 101, which includes regulator 100 and external components. Regulator 100 includes comparator circuit 120, impedance circuit 161, capacitor circuit C1, and switch control circuit 131. Externals components may include driver circuit 191, driver circuit 192, switch circuit 111, synchronous switch circuit 112, transistor M3, inductor L1, resistors R1 and R2, impedance circuit 162, output capacitor Cout, and load 150. Switch circuit 111 may include transistor M1, and synchronous switch circuit 112 may include transistors M2.

In operation, switch circuit 111 opens and closes based on signal S1DRV. Similarly, synchronous switch circuit 112 is arranged to open and close based on signal S2DRV. Voltage SW at switch node N9 is based on whether switch circuits 111 and 112 are open or closed. More specifically, switch circuit 111 couples signal VIN to node N9 if switch circuit 111 is closed, and synchronous switch circuit 112 couples a ground voltage to node N9 if synchronous switch circuit 112 is closed.

Additionally, inductor L1 is arranged to provide inductor current IL to output capacitor Cout based, in part, on voltage SW such that output voltage OUT is provided. Resistors R1 and R2 are arranged to operate as a voltage divider to provide feedback voltage VFB from voltage OUT. Also, comparator circuit 120 is arranged to compare voltage VFB with modified reference signal VREFi.

Switch control circuit 131 is arranged to provide first switch control signal S1CTL, and synchronous switch control circuit 132 is arranged to provide synchronous switch control signal S2CTL. Further, driver circuit 191 is arranged to provide signal S1DRV from signal S1CTL, and driver circuit 192 is arranged to provide signal S2DRV from signal S2CTL. Transistor M3 is arranged to operate as a sense transistor such that a drain current of transistor M3 is substantially proportional to a drain current of transistor M2. Impedance circuit 162 is arranged to provide current sense voltage CS from the drain current of transistor M3. In one embodiment, impedance circuit 162 is a resistor.

Additionally, impedance circuit 161 is arranged to provide the DC component (i.e. the substantially time-independent component) of signal VREFi. Capacitor C1 is arranged to AC-couple voltage CS to node N2 to provide the time-dependent component of signal VREFi. The effect of voltage CS on signal VREFi may be more easily understood in conjunction with the timing diagrams and accompanying explanations below. The negative slope of current IL while switch circuit 112 is closed may be referred to as "flywheel current". Capacitor C1 injects a signal that is based on the flywheel current into node N2. Accordingly, capacitor C1 may be said to perform "flywheel current injection".

Further, comparator circuit 120 is arranged to trip if a voltage associated with modified reference signal VREFi exceeds the feedback voltage VFB. In one embodiment, comparator circuit 120 provides hysteresis. In another embodiment, comparator circuit 120 does not provide hysteresis. Comparator circuit 120 is arranged to assert signal COMP_OUT if comparator circuit 120 is tripped.

Switch control circuit 131 is arranged to provide signals S1CTL and S2CTL based, in part, on signal COMP_OUT. In one embodiment, switch control circuit 131 is arranged to provide signal S1CTL such that, whenever signal COMP_OUT is asserted, signal S1CTL is on for a relatively fixed pre-determined period of time. After the relatively fixed pre-determined period of time elapses, signal S1CTL is de-asserted.

In one embodiment, one or more components shown as external components in FIG. 1 may be internal to regulator 100. For example, in one embodiment, driver circuits 191 and 192, transistors M1-M3, and impedance circuit 162 are included in regulator 100. In one embodiment, regulator 100 may be included on an integrated circuit, and elements shown as external to regulator 100 may be external to regulator 100. In another embodiment, regulator 100 and one or more components shown as external to regulator 100 may be included on the integrated circuit.

As previously discussed, in one embodiment, switch control circuit 131 is a constant on-time control circuit. By employing a constant on-time scheme, regulator 100 has a relatively fast response time, and does not require a dedicated compensation network. Also, regulator 101 may employ a constant on-time scheme without requiring a resistor in series with output capacitor Cout in order to be stable, even if capacitor Cout has negligible ESR. For example, a ceramic output capacitor having a capacitance of 10 millohms or less may be employed, without the need for a resistor in series with capacitor Cout. The flywheel current injection introduced by employing capacitor C1 to AC-couple voltage CS reduces or substantially removes sub-harmonic oscillation.

Regulator 100 is illustrated as a synchronous buck regulator in FIG. 1. However, the invention is not so limited, and other topologies are within the scope and spirit of the invention. For example, a boost regulator, flyback regulator, or the like may be employed. Also, although an embodiment with synchronous rectification is described, diode-rectified embodiments are also included in the spirit and scope of the invention, as shown in FIG. 2.

Figure 2:
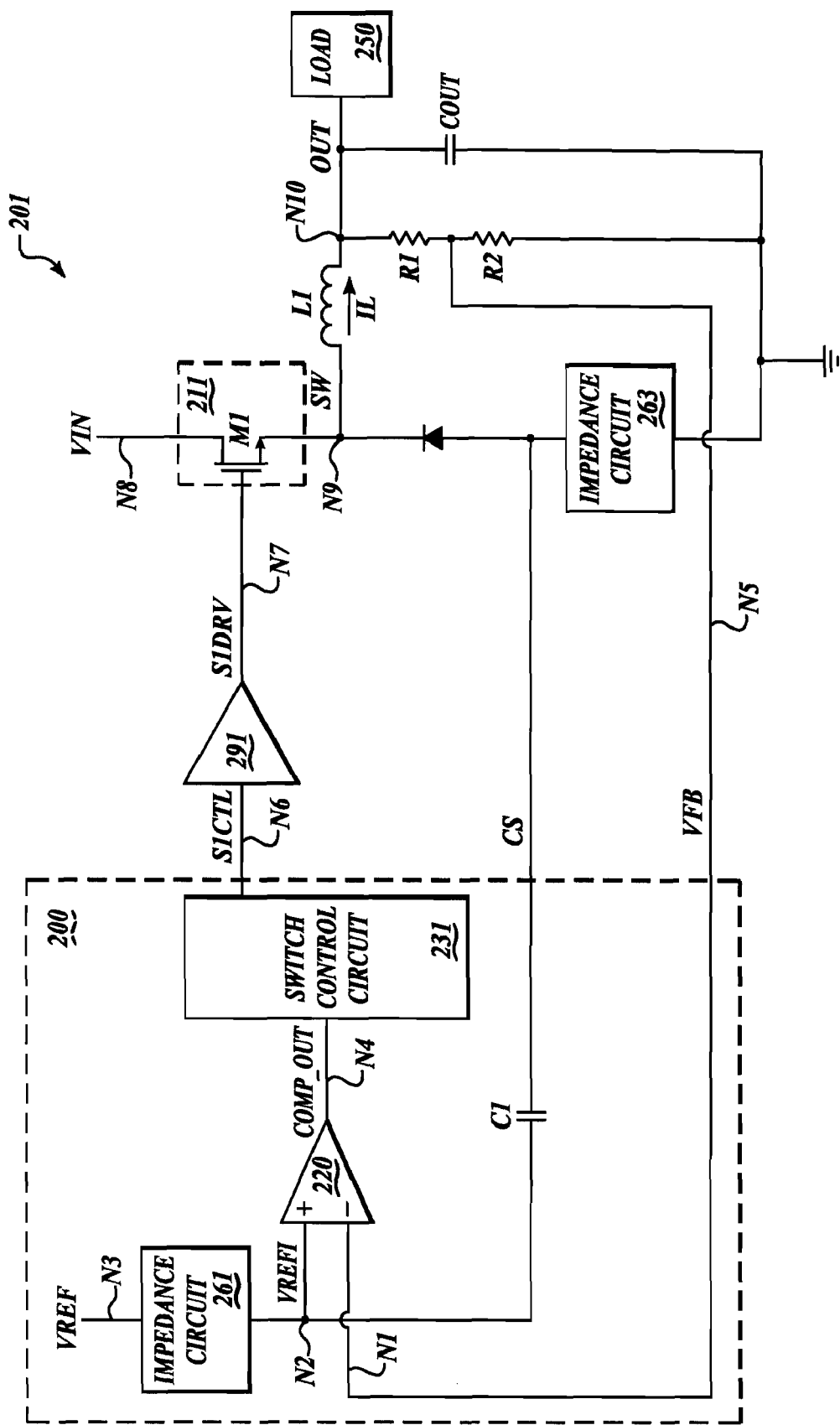
FIG. 2 shows a block diagram of an embodiment of a regulator that employs diode rectification.

FIG. 2 shows a block diagram of an embodiment of regulator 200 and external components. Regulator 200 is similar to regulator 100 of FIG. 1, except that diode rectification is employed rather than synchronous rectification.

Figure 3:
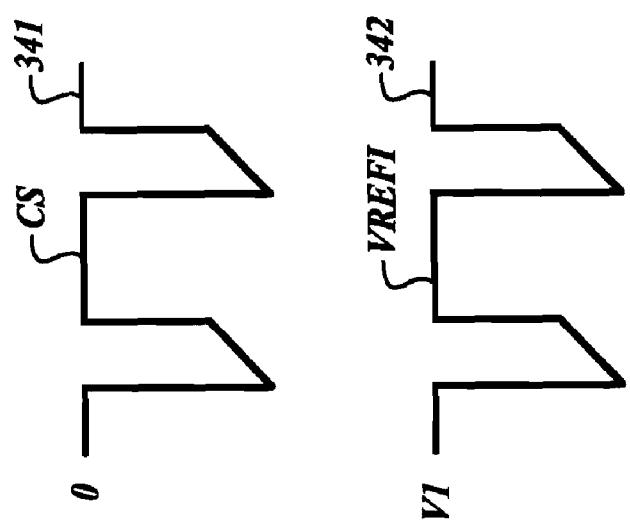
FIG. 3 illustrates a timing diagram of waveforms of embodiments of signals from FIG. 1.

FIG. 3 illustrates a timing diagram of waveforms 341 and 342 of embodiments of signal CS and signal VREFi, respectively, of FIG. 1.

When switch circuit 111 is on, switch circuit 112 is off. Accordingly, as shown by waveform 341, voltage CS is substantially zero when switch circuit 111 is on. When switch circuit 111 turns off, inductor current IL flows through synchronous switch circuit 112 rather than switch circuit 111. Additionally, voltage CS is substantially proportional to current IL when switch 112 is on. The constant of proportionality is negative, so that voltage CS decreases if current IL increases. Accordingly, voltage CS falls very rapidly when switch circuit 111 turns off. Next, current IL ramps downward, and voltage CS ramps upward accordingly. The slope of the ramp is substantially given by Vo*RS/L, where Vo is the voltage associated with output signal OUT, L is the inductance associated with inductor L1, and RS is the resistance associated with impedance circuit 162. When switch circuit 111 turns on again, voltage CS rapidly returns to zero, beginning the cycle again.

Signal VREFi has a DC component of substantially VREF. Additionally, signal CS is AC-coupled to node N2 to provide an AC component of signal VREFi. Accordingly, while switch circuit 111 is on, signal VREFi corresponds to approximately V1. When switch circuit 111 turns off, due to the AC-coupling of signal CS, signal VREFi falls rapidly. Next, voltage VREFi ramps upwards with a slope that is given by substantially Vo*RS/L. When switch circuit 111 turns on again, voltage VREFi returns to substantially V1. Voltage V1 is based, in part, on voltage VREF. However, the voltage level that voltage VREFi returns to may change based on a change in voltage VFB, as explained in greater detail below.

Figure 4:
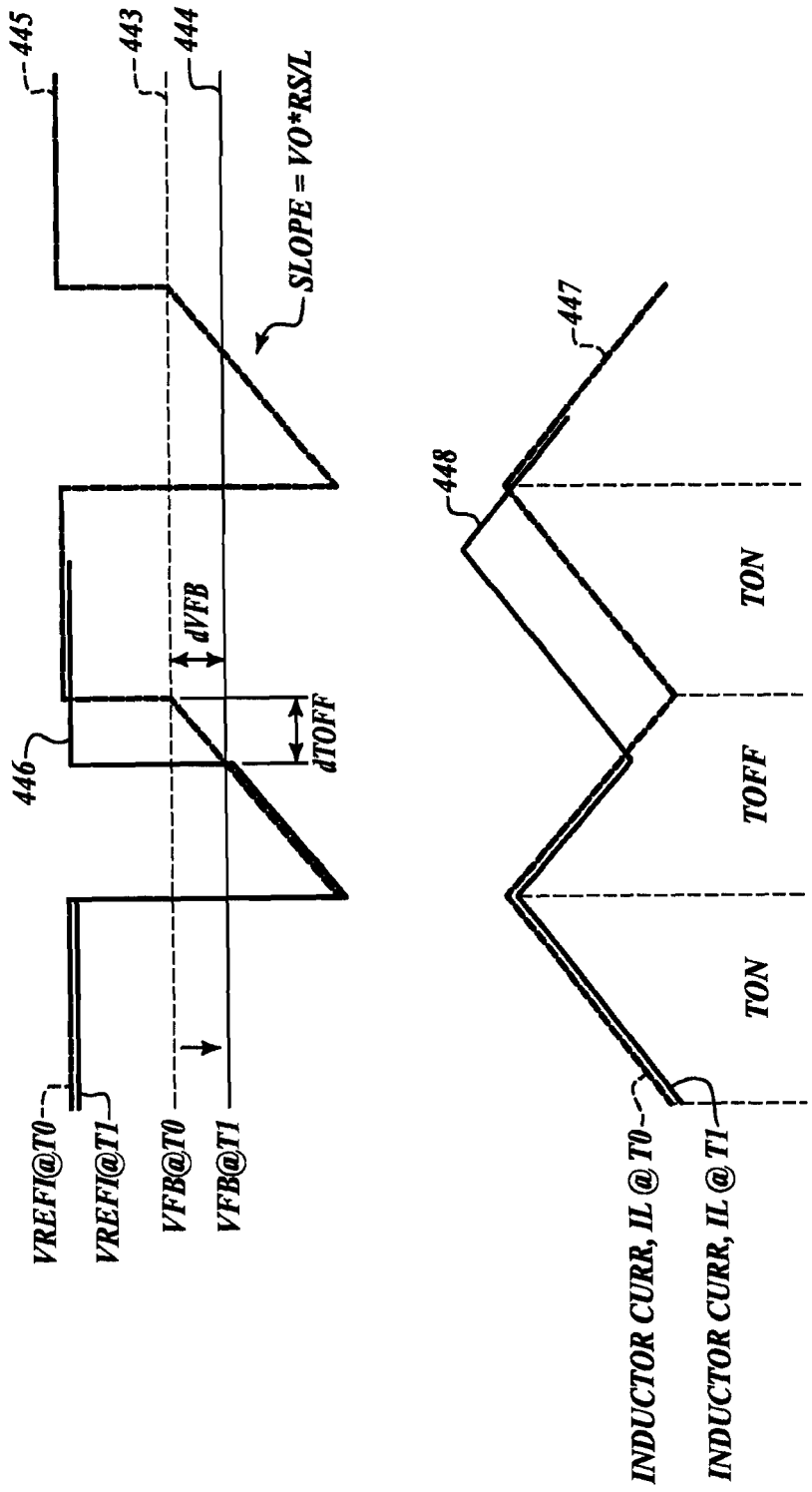
FIG. 4 illustrates a timing diagram of waveforms of embodiments of the modified reference voltage, the feedback voltage, and the inductor current of FIG. 1.

FIG. 4 illustrates a timing diagram of waveforms of embodiments of the voltage associated with modified reference signal VREFi, feedback voltage VFB, and inductor current IL of FIG. 1.

Waveform 443 illustrates feedback voltage VFB at time t0, and waveform 444 illustrates feedback voltage at VFB time t1. Waveform 445 illustrates the voltage associated with signal VREFi at time to, and waveform 446 illustrates the voltage associated with signal VREFi at time t1. Waveform 447 shows inductor current IL at time t0, and waveform 448 shows inductor current IL at time t1.

At time t1, voltage VFB drops due to, for example, a loading increase. Because voltage VFB is lower, signal VREFi reaches voltage VFB earlier in the cycle, which reduces the off-time (Toff) of signal SCTL1. As a result, current IL ramps to a higher level to supply the extra loading, causing voltage VFB to increase again.

Accordingly, if feedback voltage VFB decreases, the duty cycle of signal SCTL1 increases. The increase in duty cycle causes inductor current IL to increase, which in turns causes voltage VFB to increase. This provides a relatively fast negative feedback loop.

The flywheel current slope modulates Toff, thus the duty cycle of signal SCTL1, while:

$$dToff/dVFB = L/(Vo*RS), \text{ and}$$

$$d(duty\_cycle)/dVFB = -(Freq*L)/(Vo*RS),$$

where duty_cycle and Freq represent the duty cycle and frequency, respectively, of signal SCTL1.

Accordingly, flywheel current injection allows for constant on-time regulation that has both voltage-mode and current-mode characteristics.

Figure 5:
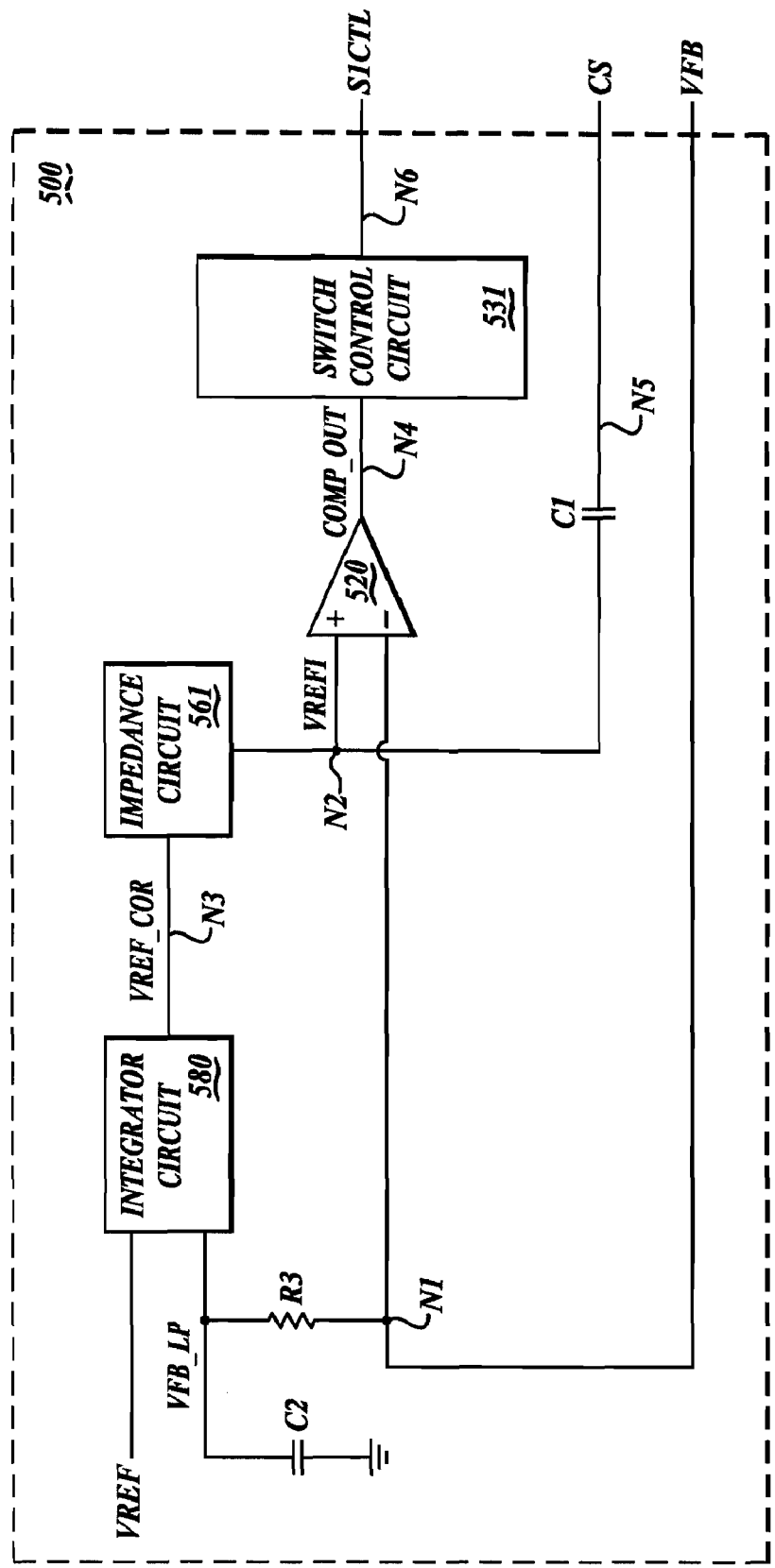
FIG. 5 shows a block diagram of an embodiment of the regulator of FIG. 1 or FIG. 2 that includes an integrator circuit.

FIG. 5 shows a block diagram of an embodiment of regulator 500. Regulator 500 may be employed as an embodiment of regulator 100 of FIG. 1 or regulator 200 of FIG. 2. Regulator 500 further includes capacitor C2, resistor R3, and integrator circuit 580.

Capacitor C2 and resistor R3 are arranged to operate as a low-pass filter that provides filtered feedback voltage VFP_LP from feedback voltage VFB such that voltage VFP_LP substantially corresponds to the DC component of voltage VFB. Additionally, integrated circuit 580 is arranged to provide corrected reference signal VREF_cor at node N3 such that signal VREF_cor is substantially given by: VREF_cor=VREF+K*(VREF−VFB_LP), where K is a gain factor from about two to about four. The additional circuitry shown in FIG. 5 operates as a slow feedback loop to provide accuracy for the regulation point of regulator 500. The additional circuitry illustrated in FIG. 5 may adjust the DC voltage of signal VREF_cor to compensate for the effects of loading on voltage VFB under certain operating conditions.

Accordingly, the additional circuitry illustrated in FIG. 5 may be employed for improved regulation. The additional circuitry illustrated in FIG. 5 is not needed under most operating conditions. However, under certain operation conditions, such as where VIN is relatively close to VOUT, load regulation may be poor without the additional circuitry illustrated in FIG. 5.

When the additional circuitry illustrated in FIG. 5 is included in regulator 500, trimming of feedback voltage VFB preferably includes the offset voltage of integrator circuit 580 instead of comparator circuit 520.

Additionally, the location of the poles contributed by integrator circuit 580 and output capacitor COUT may be adjusted for stability. Ringing may be caused by the interaction of the poles. The ringing may be reduced by adjusting the capacitance of output capacitor COUT such that the poles are farther apart.

Figure 6:
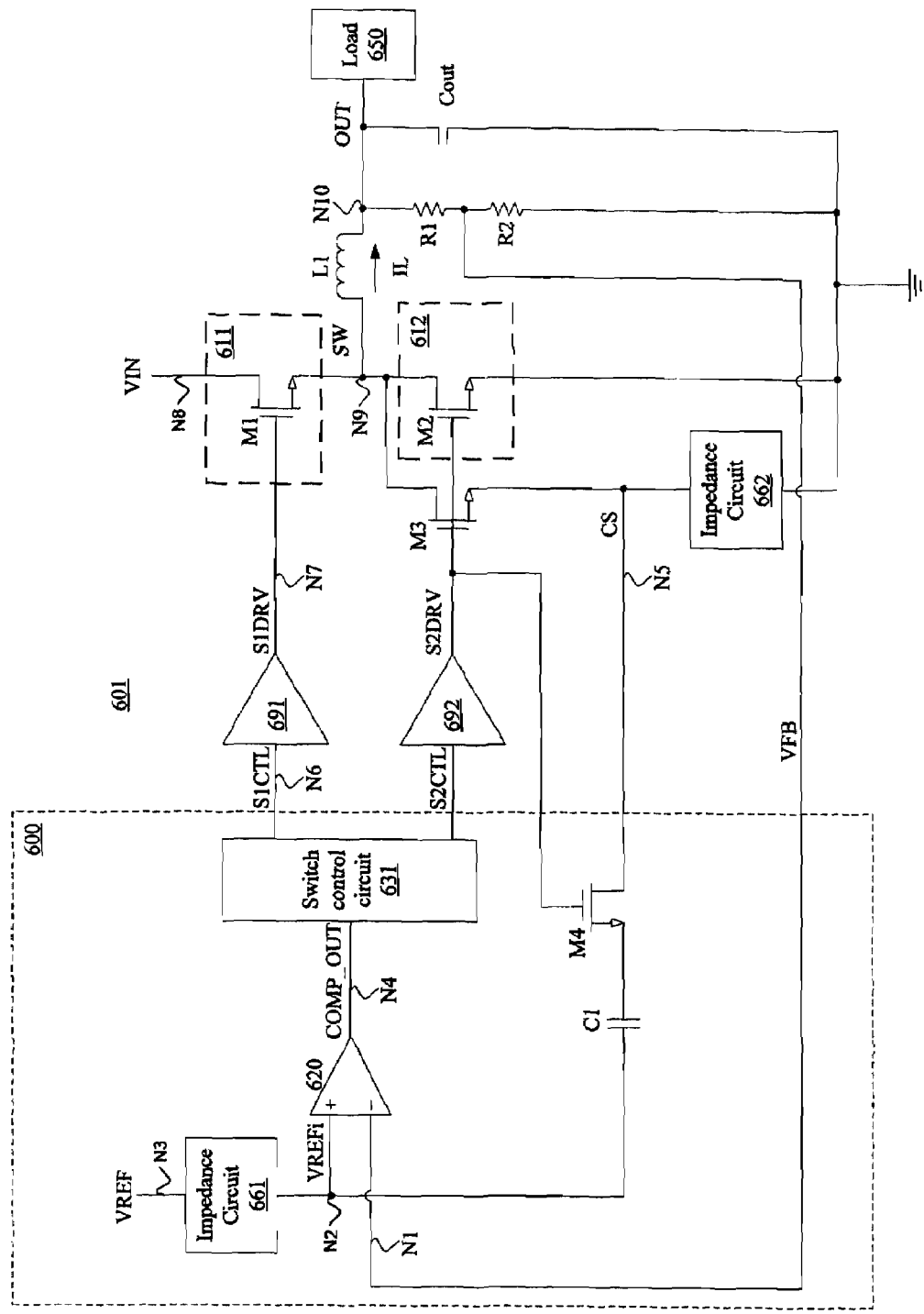
FIG. 6 illustrates a block diagram of an embodiment the circuit of FIG. 1.

FIG. 6 illustrates a block diagram of circuit 601, which may be employed as an embodiment of circuit 101 of FIG. 1. Regulator 600 further includes transistor M4.

Transistor M4 operates as a switch that closes when switch 612 is closed and opens when switch 612 opens. Switch M4 may be included in regulator 600 for improved load regulation. Switch M4 is not needed under most operating conditions. However, under certain operation conditions, such as where VIN is relatively close to VOUT, load regulation may be poor without switch M4. Switch M4 and the additionally circuit illustrated in FIG. 5 may both be used together in one embodiment to provide better load regulation performance than either feature alone.

FIG. 7 illustrates a timing diagram of waveforms 741 and 742, respectively, of embodiments of signals CS and VREFI from an embodiment of circuit 600 of FIG. 6. Comparing FIG. 3 with FIG. 7, it is noted that in FIG. 7, the DC component of signal REFI is removed by switch M4, which may improve load regulation.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A regulator circuit, comprising:
a comparator circuit including a first input that is coupled to a first node, a second input that is coupled to a second node, and an output, wherein the comparator is arranged to provide a comparison output signal at the output of the comparator based, in part, on a comparison of a feedback signal at the first node with a modified reference signal at the second node;
an impedance circuit that is arranged to couple a reference signal to the second node such that the modified reference signal is based, in part, on the reference signal;
a switch that is coupled between a current sense node and another node; and
a capacitor circuit that is coupled between said another node and the second node, wherein the capacitor is arranged to AC-couple a current sense voltage at the current sense node to the second node such that the modified reference signal is based, in part, on the current sense voltage.

2. The regulator circuit of claim 1, wherein the impedance circuit includes a resistor that is coupled between a reference node and the second node.

3. The regulator circuit of claim 2, further comprising a reference voltage source that is arranged to provide a relatively constant reference voltage at the reference node.

4. The regulator circuit of claim 2, further comprising:
reference voltage source that is arranged to provide a relatively constant reference voltage;
a low pass filter that is arranged to provide a filtered feedback voltage from the feedback signal; and
an integrator circuit that is arranged to provide the reference signal at the reference node based on the relatively constant reference voltage and the filtered feedback voltage such that reference signal is offset by an offset voltage level from the relatively constant reference and such that the offset voltage level is substantially proportional to a difference between the relatively constant reference voltage and the filtered feedback voltage.

5. The regulator circuit of claim 1, further comprising:
a switch control circuit that is coupled to the output of the comparator.

6. The regulator circuit of claim 5, wherein the comparator circuit is arranged to assert a comparison output signal if a feedback voltage associated with the feedback signal is less than a modified reference voltage associated with the modified reference signal, and switch control circuit is arranged to assert a switch control signal for a relatively fixed period of time when comparison output signal is asserted, and wherein the switch is arranged to be open when the switch control signal is asserted.

7. The regulator circuit of claim 5, further comprising:
another switch that is coupled to a switch node, wherein said another switch includes a control input; and
a driver circuit that is coupled between said another switch and the control input of said another switch.

8. An apparatus, comprising:
a regulator circuit, including:
a switch including a control input, wherein the switch is coupled between an input node and a switch node, and wherein the control input is coupled to a switch control node;
a comparator circuit including a first input that is coupled to a reference comparison input node, a second input that is coupled to a feedback node, and an output that is coupled to a comparator output node;
a switch control circuit that is coupled to the comparator output node and a driver input node;
a driver circuit that is coupled between the driver input node and the switch control node;
a second switch that is coupled between a flywheel current sense node and another node, wherein the regulator circuit has a flywheel current during operation of the regulator circuit, and wherein the regulator circuit is arranged such that a voltage at the flywheel current sense node is proportional to the flywheel current;

a capacitor circuit that is coupled between said another node and the reference comparison node; and an impedance circuit that is coupled between a reference signal node and the reference comparison input node.

9. The apparatus of claim 8, wherein the comparator circuit is arranged to assert a comparison output signal at the comparison output node if a feedback voltage at the feedback node is less than a modified reference voltage at the reference comparison node, and wherein the switch control circuit is arranged to assert a driver input signal at the driver input node for a relatively fixed period of time when comparison output signal is asserted.

10. The apparatus of claim 8, further comprising a reference voltage source that is arranged to provide a relatively constant reference voltage at the reference signal node.

11. A regulator circuit, comprising:

a switch including a control input, wherein the switch is coupled between an input node and a switch node, and wherein the control input is coupled to a switch control node;

a comparator circuit including a first input that is coupled to a reference comparison input node, a second input that is coupled to a feedback node, and an output that is coupled to a comparator output node;

a switch control circuit that is coupled to the comparator output node and a driver input node;

a driver circuit that is coupled between the driver input node and the switch control node;

a second switch that is coupled between a sense node and another node;

a capacitor circuit that is coupled between said another node and the reference comparison node;

an impedance circuit that is coupled between a reference signal node and the reference comparison input node;

a reference voltage source that is arranged to provide a relatively constant reference voltage;

a low pass filter that is arranged to provide a filtered feedback voltage from a feedback signal at the feedback node; and an integrator circuit that is arranged to provide a reference signal at the reference signal node based on the relatively constant reference voltage and the filtered feedback voltage such that reference signal is offset by an offset voltage level from the relatively constant reference, and such that the offset voltage level is substantially proportional to a difference between the relatively constant reference voltage and the filtered feedback voltage.

12. A method for regulating an output signal, comprising:

providing the output signal by employing relatively constant on-time regulation, wherein employing relatively constant on-time regulation includes comparing a feedback signal with a comparison signal, wherein the comparison signal is provided at a comparison node, and wherein the relatively constant on-time regulation includes opening and closing a main switch; and modifying the comparison signal based on flywheel current injection, wherein modifying the comparison signal based on the flywheel current injection includes:

providing a current sense signal that is based, in part, on the flywheel current;

coupling the current sense signal to a comparison node; and de-coupling the current sense signal from the comparison node if the main switch is closed.

13. The method of claim 12, wherein modifying the comparison signal based on the flywheel current injection is accomplished such that the relatively constant on-time regulation includes both current-mode characteristics and voltage-mode characteristics.

14. The method of claim 12, wherein providing the output signal is accomplished, in part, with an output capacitor; and wherein modifying the comparison signal based on the flywheel current injection is accomplished such that sub-harmonic oscillation is substantially removed even if an equivalent series resistance of the output capacitor is relatively small.

15. The method of claim 12, wherein:

providing the output signal is accomplished, in part, with an inductor and the main switch, wherein the inductor provides a flywheel current when the main switch is off.

16. The method of claim 15, wherein coupling the current sense signal to the comparison node is accomplished by AC-coupling the current sense signal to the comparison node, and wherein de-coupling the current sense signal from the comparison node includes opening another switch between the current sense signal and the comparison node when the main switch is off.

17. The method of claim 12, wherein providing the output signal by employing relatively constant on-time regulation includes:

opening and closing the main switch based on a switch control signal, such that an input voltage is coupled to a switch node if the main switch is closed;

providing an inductor current based, in part, on a voltage at the switch node, wherein the output signal is based, in part, on the inductor current;

providing the feedback signal based, in part, on the output signal;

providing the comparison signal at a comparison node such that the comparison signal is based, in part, on a reference signal;

providing a comparison output signal based on comparing the comparison signal with the feedback voltage; and asserting the switch control signal for a relatively constant period of time if the comparison output signal is asserted.

18. The method of claim 17, wherein coupling the current sense signal to a comparison node is accomplished by AC-coupling the current sense voltage to the comparison node.

19. The method of claim 18, wherein modifying the comparison signal further includes:

correcting the comparison signal to compensate for effects of loading on the feedback voltage.

20. The method of claim 18, wherein providing the current sense voltage includes:

providing a current sense current that is substantially proportional to the flywheel current; and employing a resistor to provide the current sense voltage from the current sense current.

* * * * *

UNITED STATES PATENT AND TRADEMARK OFFICE
CERTIFICATE OF CORRECTION

PATENT NO. : 7,579,819 B1
APPLICATION NO. : 11/736497
DATED : August 25, 2009
INVENTOR(S) : Lawrence Hok Sun Ling Page 1 of 1

It is certified that error appears in the above-identified patent and that said Letters Patent is hereby corrected as shown below:

In column 3, line 52, delete "millohms" and insert -- milliohms --, therefor.

In column 4, line 42, delete "to" and insert -- t0 --, therefor.

Signed and Sealed this

Twenty-fourth Day of November, 2009

David J. Kappos
*Director of the United States Patent and Trademark Office*